Nov. 24, 1936. A. M. ROSSMAN 2,061,983
SYSTEM FOR ADJUSTABLE SPEED CONTROL OF ALTERNATING CURRENT MOTORS
Filed March 7, 1932 5 Sheets-Sheet 1

FIG. I

INVENTOR
ALLEN M. ROSSMAN
BY
ATTORNEYS

Patented Nov. 24, 1936

2,061,983

UNITED STATES PATENT OFFICE 2,061,983

SYSTEM FOR ADJUSTABLE SPEED CONTROL OF ALTERNATING CURRENT MOTORS

Allen M. Rossman, Wilmette, Ill., assignor to Rossman Engineering Company, Chicago, Ill., a corporation of Illinois Application March 7, 1932, Serial No. 597,144

34 Claims. (Cl. 172—274)

My invention relates to a system of developing mechanical power at adjustable speed from alternating current of constant frequency, or conversely, of generating electric power at adjustable frequency from mechanical energy at constant speed. More specifically, it provides a system of regulating the speed of wound rotor induction motors without the usual rheostat losses in the secondary circuit and without the wide fluctuations in speed with variations in the torque load.

The theory of the system is based on the control of a standard wound rotor type of induction motor by adjusting the frequency of the electrical energy flowing in its secondary circuit.

Whereas other systems of speed control based on this theory and giving an equivalent speed range employ electrical machines of a complex nature necessitating the use of A. C. commutators, compensating windings, etc., my invention, in the preferred form utilizes a combination of the simplest types of electrical machines. Furthermore, the regulating machines of my invention can inherently be operated over a double range. By this double range regulating system the speed of the main shaft is varied over its entire range by adjusting the speed of the auxiliary machine over its speed range twice—from maximum speed in one direction through zero to maximum speed in the opposite direction. This feature has the advantage of reducing the horsepower capacity of the regulating equipment to one-half of that necessary for single range control systems.

According to the preferred form of the present invention, I combine a wound rotor induction motor and a synchronous motor generally of comparatively smaller rating connected in cascade or concatenation with the induction motor.

By concatenation, I refer to that arrangement in which the alternating current winding of the synchronous motor is connected in series with the secondary winding of the induction motor and the shafts of the two motors are rigidly connected by coupling or gears, or the two machines are mounted on and keyed to the same shaft. The frame of the synchronous motor, usually referred to as the stator, is mounted on bearings so that it can be rotated in either direction by means of an auxiliary machine to which it is mechanically connected. This auxiliary machine may be of any known type either A. C. or D. C. and may be supplied with power from any convenient source of alternating current or direct current energy according to its type.

In the preferred embodiment of my invention, the armature windings of the synchronous motor are placed on the rotor, although equal operating results may be obtained by the more conventional arrangement of placing the field poles on the rotor. The advantage of the arrangement in the preferred form lies in that it permits the armature windings of the synchronous machine to be connected directly in series with the rotor or secondary windings of the induction motor without the necessity of employing collector rings and brushes. This is an important consideration in machines of large capacity.

In the preferred form, the frame of the synchronous motor is driven by a separately excited direct current motor, the armature of which is electrically connected in series with the armature of a separately excited D. C. generator of a motor generator set, a system disclosed in my United States Patents, No. 1,828,943, issued October 27, 1931 and No. 1,830,485, issued November 3, 1931. The former patent discloses an arrangement in which the D. C. motor is direct connected to the rotatable frame, while the latter shows an arrangement by which the D. C. machine is given a mechanical advantage by connecting it to the A. C. frame by means of a flexible band drive. The system as disclosed in these patents is, in itself, a system of adjustable speed drive which can be applied to drive any type of load at adjustable speeds, but is best adapted to loads of comparatively high speeds.

My present invention, however, offers decided advantages over the system disclosed in the two foregoing patents when applied to high torque low speed loads. As motor sizes increase and their speeds decrease, their frames become heavier and require higher torque, slower speed, and consequently more expensive D. C. motors to drive them. The system disclosed herein, overcomes the difficulty of rotating the heavy frame at slow speed by employing a design in which most of the power is delivered by the wound rotor induction motor of conventional design, while a comparatively small amount of power is furnished by the rotating frame machine and this power can be furnished at high speed and consequently low torque, resulting in a lighter and more economical design.

This system of speed control is especially applicable to steel mill motors, large slow speed pump motors and those large frequency converter sets which tie together systems of varying frequency ratio.

The principles of operation are as follows:

With the rotating frame stationary the speed is the same as that of any concatenation of a synchronous motor with an induction motor, that is, the shaft rotates at a speed corresponding to that of a synchronous motor having a number of poles equal to the sum of the poles of the two machines.

If the frame be now rotated in the same direction as that of the rotor, the relative speed between the two, and consequently the frequency of the energy flowing in the secondary circuit is decreased. As the speed of an induction motor bears a fixed relation to the impressed frequency minus the frequency in the secondary circuit, decreasing the latter frequency causes an increase in speed and vice versa. The speed of the frame can be increased until it is running at substantially the same speed as the rotor minus the slip of the induction motor, resulting in an increase in the shaft speed to the maximum speed which the induction motor could attain if operating alone, except as its speed is further limited by the additional resistance of the armature circuit of the synchronous motor with which its secondary circuit is connected in series.

It is also possible to control the speed of the shaft at speeds above the synchronous speed of the induction motor, in which case the synchronous machine acts as a generator supplying power to the secondary winding of the synchronous motor, the frame being driven at higher speeds than that of the rotor. This feature is applicable only in special cases, however, as it is not possible to accelerate the load shaft through synchronism against full load torque with the equipment as described herein.

If the frame be rotated in the direction opposite to that of the rotor, the relative speed between the two, and consequently the frequency, are increased, resulting in a corresponding decrease in speed of the induction motor.

The frame of the synchronous motor is rotated in either direction by means of the auxiliary machine. When the rotation is in the same direction as that of the rotor, the auxiliary machine supplies mechanical energy to the synchronous motor frame. When the rotation of the frame is in the opposite direction to that of the rotor, the frame drives the auxiliary machine which runs as a generator, returning energy to the line.

The ratio of the speed of the rotatable frame to the change in speed of the main shaft is equal to the ratio of the sum of the poles on the two drive machines to the number of poles on the synchronous machine.

The following rules for determining the relative ratings of the alternating current motors are based on the concept that in a system of this kind each pole of the two concatenated A. C. motors carries an equal share of the total torque. Applying this concept, the following ratios can be derived:

(1) At any speed, the ratio of the horsepower output of the induction motor to the total load is equal to the ratio of the number of poles on the induction motor to the sum of the number of poles on both concatenated A. C. motors.

(2) At any speed, the ratio of the sum of the outputs of the synchronous motor and the auxiliary machine to the total load is equal to the ratio of the number of poles on the synchronous motor to the sum of the number of poles on both concatenated A. C. motors.

(3) At any speed, the ratio of the output of the synchronous motor to the sum of the outputs of the synchronous motor and the auxiliary machine is equal to the ratio of the load speed minus the frame speed to the load speed, consideration being given to plus and minus signs.

(4) At any speed, the ratio of the output of the auxiliary machine to the sum of the outputs of the synchronous motor and the auxiliary machine is equal to the ratio of the frame speed to the load speed.

In the preferred form the speed of the frame can be adjusted in as small increments as desired, from maximum speed in one direction through zero to maximum speed in the opposite direction by regulating the field of the D. C. generator of the motor generator set.

Assuming a constant torque load, the torque does not change in magnitude or direction as the frame of the synchronous motor passes through zero speed and therefore the current in the auxiliary motor is constant over the entire speed range.

Although in the foregoing explanation the synchronous motor has been described as being connected to the main drive shaft, this detail is not essential to the operation of the system. The synchronous motor shaft can be connected to any shaft or load which is suitable for utilizing or dissipating the energy from the induction motor secondary and from the auxiliary machine. For instance, the synchronous motor can be connected to another synchronous or induction machine which is connected electrically to the source of power. In this case the energy is converted back into electrical energy and put back into the system. In the embodiment, including a separately excited D. C. machine as the auxiliary machine, obtaining power from a motor generator set, the synchronous motor with the rotatable frame can be direct connected to the shaft of the motor generator set. The output ratios in this case are somewhat different from those given above but can be easily determined by following the same concept that for the same current, each pole on each of the interconnected A. C. machines exerts an equal torque.

Although the foregoing explanation is based on direct concatenation, in which case the speed of the shaft is equal to that of a synchronous motor having a number of poles equal to the sum of the poles of the two machines, by reversing the connections to the synchronous motor alternating current winding, the two machines can be connected in differential concatenation. In that case the speed of the shaft is equal to that of a synchronous motor having a number of poles equal to the difference between the number of poles on the two machines. By taking advantage of these two connections, two ranges of speed control can be obtained.

In applications which require starting and accelerating under load, an adjustable rheostat can be inserted in series with the induction motor secondary winding and the synchronous motor armature winding. This rheostat can be short circuited after the machines have been brought up to speed.

Now in order to acquaint those skilled in the art with the manner of constructing and operating a device embodying my invention, I shall describe in connection with the accompanying drawings, one or more specific embodiments of the invention and describe their mode of operation.

In the drawings.

In the drawings, like reference numerals refer to like parts throughout.

Figure 1:
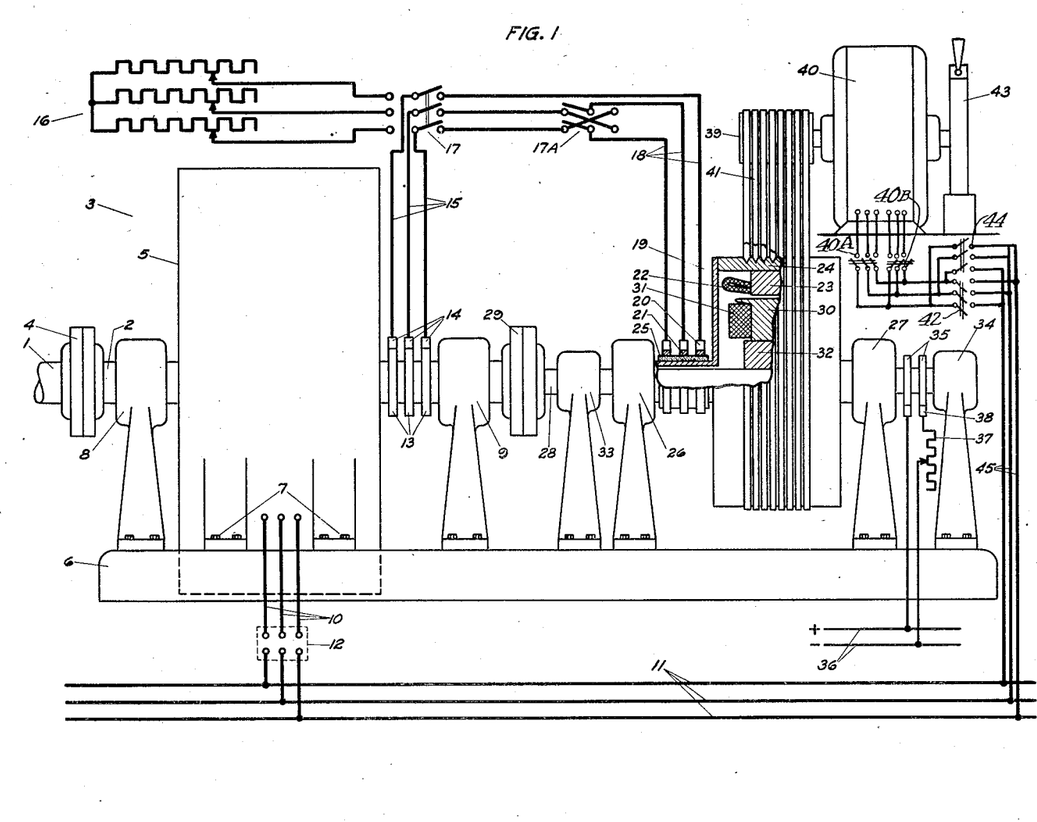
Fig. 1 is a diagram of one form of adjustable speed drive of my invention employing an alternating current auxiliary machine.

Referring now to Fig. 1, the shaft 1 to which is connected the load (not shown) is connected to the shaft 2 of the main wound rotor induction motor 3 by means of a coupling 4. The frame 5 carrying the primary winding of the induction motor has feet 7 which are bolted down to the base or foundation 6. The rotor shaft 2 is supported at each end by pedestal bearings 8 and 9 which are also bolted to base 6.

The primary windings are connected to phase leads 10 which are connected to the alternating current supply mains 11 through circuit breaker 12. The secondary windings on the rotor are brought out to collector rings 13 from which current is taken off by brushes 14 to secondary leads 15.

An adjustable rheostat 16 is shown as it may be desirable to start the main induction motor alone by means of a resistor in the secondary circuit. A double throw switch 17 is provided for selecting between the rheostat 16 and the leads 18 leading to the synchronous motor 19 through brushes 20 and collector rings 21 to which are brought out the circuits from the armature winding 22 of the synchronous motor 19. By connecting the rheostat in series with the leads 15, 18 from the two machines, as will be shown in another embodiment, the torque of both motors can be utilized when starting. A reversing switch 17A is shown connected in the leads 18 from the synchronous motor 19. By means of this switch the synchronous motor may be connected in either direct or differential concatenation with the induction motor 3. The armature windings 22 and core 23 are carried in the frame 24 which carries the collector rings 21 in insulated relation on insulating support 25. The frame 24 is supported at each end on pedestal bearings 26 and 27 and is therefore free to rotate in said bearings which are fastened to the base.

Figure 4:
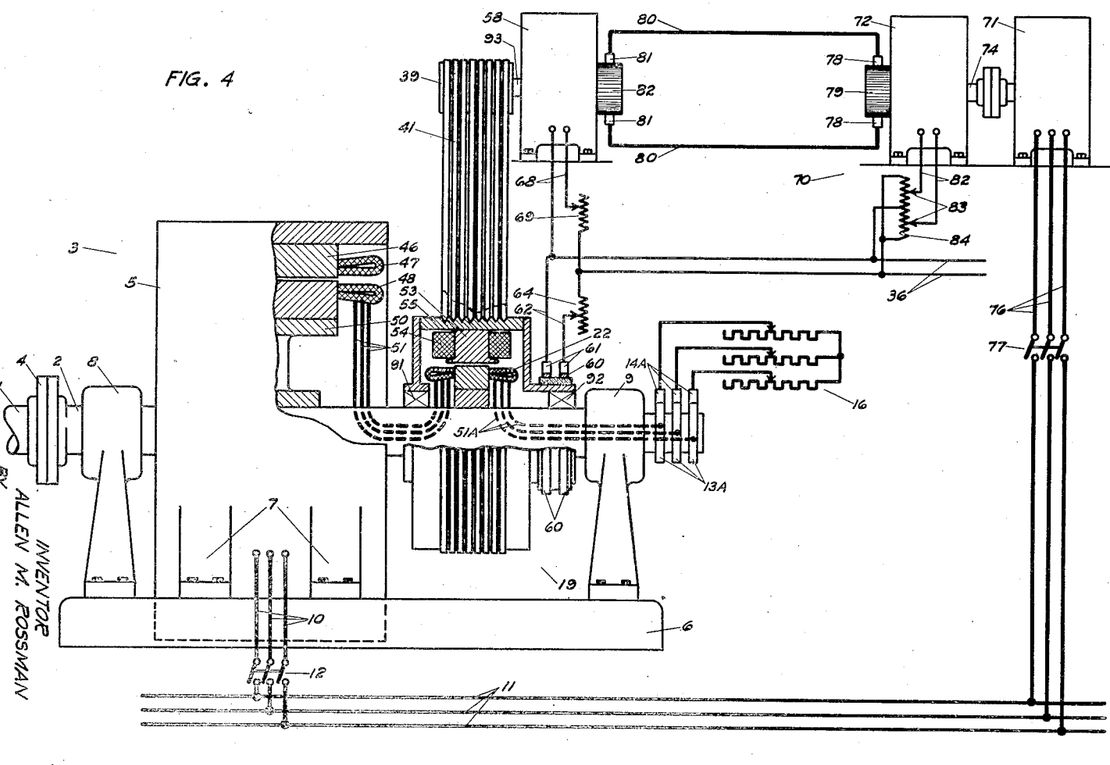
Fig. 4 is a more compact design showing the induction and synchronous motors keyed on a common shaft.

The rotor of the synchronous motor consists of a shaft 28, coupled to the shaft 2 of the induction motor by means of a coupling 29, field poles 30 and windings 31, as indicated in section in the cut away view, and a yoke 32 fastened to the shaft 28. The rotor is carried at each end on pedestal bearings 33 and 34. Instead of four separate pedestals as shown, the frame could be supported on the rotor shaft on roller or ball bearings and the shaft in turn supported on two pedestal bearings as shown in Fig. 4.

The field windings 31 are brought out to collector rings 35. Direct current excitation from bus bars 36, which are connected to a substantially constant voltage source of D. C. energy, is impressed on the windings 31 through a control rheostat 37, brushes 38, and rings 35. By means of a rheostat 37 the power factor of the power input to the induction motor can be adjusted.

The frame 24 of the synchronous motor 19 is mechanically connected to the pulley 39 on the auxiliary motor 40 by means of a multiple strand drive 41.

In Figure 1, the auxiliary machine 40 is a multispeed squirrel cage induction motor of conventional type, the speed of which is controlled by changing the number of poles in the machine, either by a reconnection of a single winding or by two separate windings in a well-known manner. A two-speed motor is indicated, which can be connected for its lower speed by closing one of the speed selecting switches 40A, and for its high speed by closing the other of the speed selecting switches 40B. A pair of reversing switches 42, 44 determine the direction of rotation of the motor 40. Power is brought from the bus 11 by leads 45.

The system shown in Figure 1 has five operating speeds: A maximum speed when the motor 40 is driving the synchronous motor frame 24 in the same direction as its rotor shaft 28 at the maximum speed of the auxiliary motor 40, a second and lower speed with the auxiliary machine on its lower speed connection, a mid-speed when the motor 40 is disconnected from the line and the shaft held stationary by means of a brake 43, a fourth speed when the auxiliary machine is operating at its lower speed but in the opposite direction to that of the shaft 28, and a minimum speed when the auxiliary motor is running at its maximum speed in the last mentioned direction. At any of the operating speeds, the speed of the main shaft is substantially constant, irrespective of load or whether the main machine is motoring or regenerating.

Instead of the direct connection between the synchronous and induction motors a gear reduction may be used. This would permit the synchronous motor to operate at a higher speed with lower torque resulting in a smaller and lighter machine.

Figure 2:
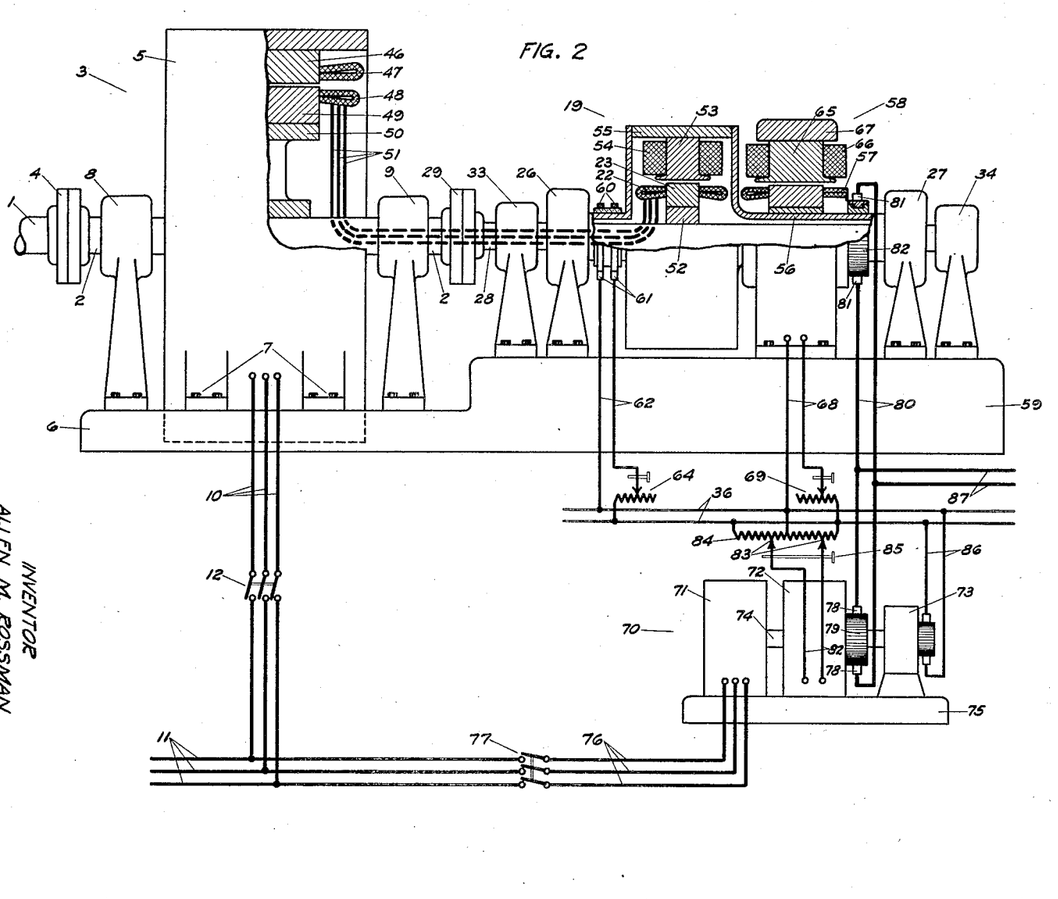
Fig. 2 is a preferred form showing a system of speed control employing a direct current auxiliary machine controlled by a motor generator set.

Fig. 2 is one preferred form of my invention. Here the wound rotor type induction motor 3 is similar to that in Fig. 1, except that the collector rings are omitted. The motor is cut away to show the cores and windings partly in cross section.

The stator or primary core 46 and winding 47 are mounted in the frame 5. The secondary or rotor winding 48 and core 49 are mounted on a spider 50 fixed on the motor shaft 2.

The leads 51 from the secondary winding are carried into the shaft 2, which is hollow for this purpose, and through the hollow shaft and the coupling 29 into the hollow shaft 28 of the synchronous motor 19. The leads are connected to the armature windings 22 so that these windings are in series with the secondary windings 48 of the induction motor 3. In this embodiment the synchronous motor is constructed with the armature windings 22 and the core 23 mounted on the rotor spiders 52 which is fixed on the shaft 28, so that this direct series connection can be made without the necessity for collector rings. The shaft 28 of the synchronous motor is carried on pedestal bearings 33 and 34 which are mounted on an extension 59 of the base 6.

The field poles 53 and field coils 54 are carried by the rotatable frame 55. The frame has an extension 56 on which is mounted the armature 57 of the D. C. motor 58. The frame extension 56 is supported in bearing 27 which in this case is of the pedestal type mounted on an extension 59 of the base 6. The other end of the frame 55 is supported in pedestal bearing 26 which is also mounted on the base. These bearings 26, 27 instead of being of the pedestal type could be ball or roller bearings supporting the rotatable frame directly on the shaft 28, as shown in Fig. 4.

The field windings are brought out to collector rings 60 which are mounted on the rotatable frame. Brushes 61 cooperating with the slip rings are connected by field leads 62 to the D. C. excitation buses 36 through adjustable rheostat 64 by means of which the field strength of the synchronous motor and consequently the power factor of the concatenated pair of motors 3 and 19 can be adjusted.

The auxiliary machine in this embodiment is a separately excited D. C. machine 58. The armature 57 is mounted on and fixed to the extension 56 of the rotatable frame 55 of the synchronous motor. The field poles 65 on which are wound the field coils 66 are mounted within the yoke or frame 67 which is supported on and fastened down to the base. The D. C. auxiliary machine is therefore arranged for driving the rotatable frame of the synchronous motor.

The field circuit of the auxiliary motor 58 is connected to the excitation bus 36 through leads 68 and through adjustable rheostat 69.

Figure 5:
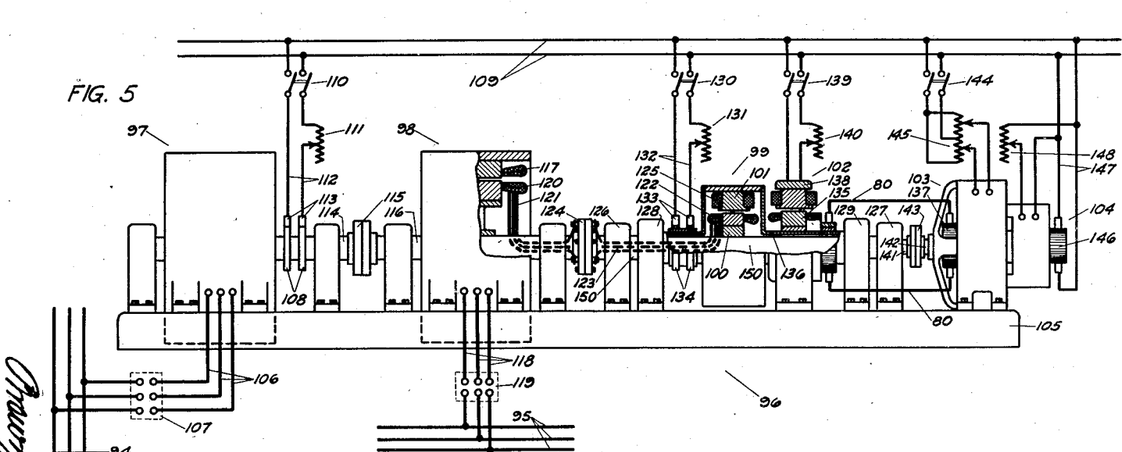
Fig. 5 is a diagram of the principles of my invention as applied to an adjustable ratio frequency converter set.

The D. C. auxiliary machine 58 obtains power and is controlled through a regulating motor generator set 70 consisting of a constant speed A. C. motor 71 of either synchronous or induction type, a separately excited direct current generator 72 and a direct current exciter 73 all mounted on one shaft 74. This motor generator set is of standard design and is mounted on a base 75. With this arrangement a constant torque drive is obtained. By coupling the D. C. generator 72 to the main shaft 28 (or 2) instead of to the A. C. motor 71, a constant horsepower at all speeds is available at the drive shaft. This method of driving the D. C. generator is illustrated in Fig. 5.

The A. C. motor 71 is connected through leads 76 and a switch or circuit breaker 77 to the A. C. supply mains 11. This motor 71 drives the D. C. generator 72 at a substantially constant speed.

The armature of the D. C. generator 72 is electrically connected in series with the armature 57 of the D. C. machine 58 through brushes 78 cooperating with the commutator 79 of the generator 72, D. C. power leads 80, and brushes 81 cooperating with the commutator 82 of the D. C. auxiliary machine 58.

The field of the generator 72 obtains energy from the excitation bus 36 through field leads 82 which are connected to the movable contacts 83 of a potentiometer type rheostat 84 which is connected between the excitation bus bars 36. By moving the handle 85 of the rheostat 84 from one extreme to the other, the voltage impressed on the generator field is varied from maximum positive to maximum negative which results in a variation in field strength and therefore the terminal voltage at the brushes 78 from maximum positive through zero to maximum negative, assuming the motor generator set to be running at normal speed.

As this voltage is impressed on the armature of the D. C. auxiliary machine 58 through the leads 80 and brushes 81, this machine is caused to rotate at speeds from maximum in one direction through zero to maximum in the opposite direction, assuming that the field strength of the motor 58 is kept constant.

Excitation power is furnished by an exciter 73 of the usual type, driven by the shaft 74 of the motor generator set and connected to the excitation bus through leads 86. The excitation bus 36 could, however, be energized from any source of direct current of the proper potential.

The operation of the system of adjustable speed drive is as follows:

The induction motor 3 and the motor generator set 70 are each brought up to speed in any approved manner such as by the reduced voltage method employing an auto-transformer (not shown). The motor generator set should be started at the same time or before the main motor to prevent the frame of the synchronous motor from attaining too high a speed before the main motor comes up to speed. In some cases it may be desirable to use a separate exciter motor generator set which would be started first, so that the D. C. machine would be excited before starting. It may also be desirable to place the potentiometer rheostat in the neutral or mid-position during starting.

Assuming the induction motor and motor generator set to be running with the potentiometer rheostat in the mid-position, the voltage on the field of the generator is therefore zero and the machine is generating no voltage. The D. C. auxiliary machine 58 is under full excitation but the armature is short circuited through the armature of the generator 72. This causes the auxiliary motor to be held at a low speed, that is, just turning over fast enough to generate sufficient voltage to cause the required current to flow through the armature circuit.

The field poles of the synchronous motor are likewise held at a low speed so that the speed of the main shaft is therefore substantially the synchronous speed of the concatenated couple. This speed is equal to that of a synchronous motor with a number of poles equal to the sum of the poles on the induction and synchronous motors.

Now let the potentiometer rheostat be moved so that the generator will generate voltage of a polarity that will cause the D. C. motor to rotate the frame of the synchronous motor in the same direction as that of the main shaft, thereby decreasing the relative speed between the armature and the field. As the relative speed decreases the frequency in the armature must decrease, thereby decreasing the frequency in the secondary winding of the induction motor, resulting in an increase in shaft speed. In this manner the speed of the induction motor can be increased up to the maximum speed that the induction motor could attain if operating alone, except as its speed is further limited by the additional resistance of the armature circuit of the synchronous motor.

The shaft speed is decreased below the normal speed by bringing the generator field up in the opposite direction, causing the synchronous motor frame to rotate the D. C. auxiliary motor in the direction of rotation opposite to that of the shaft. This increases the relative speed of the rotor and frame of the synchronous motor, resulting in an increase in the frequency in the induction motor secondary circuit and therefore a decrease in shaft speed. In this part of the range below the normal speed of the concatenated couple, when the frame of the synchronous motor rotates the D. C. auxiliary machine, the latter operates as a generator, sending power back into the A. C. supply mains through the (now inverted) motor generator set.

The lower limit in shaft speed is that at which the D. C. armature voltage has reached its limit. When the driven load has the characteristic of decreasing torque with decreasing speed, however, the lower limit of the speed range can be extended by reducing the field strength of the D. C. auxiliary machine 58 by adjusting the field rheostat 69. As long as the current in the D. C. machine does not exceed rated full load current, the lower limit in shaft speed is limited by the peripheral velocities attained by the synchronous motor frame and the D. C. auxiliary machine. In practice, it has been found expedient to build the two field control rheostats 69 and 84 into one unit and controlled by a single operating mechanism.

It is possible to control the D. C. auxiliary machines on several drive units from one motor generator regulating set. For example, in a steel mill, one motor generator set can control the drives on several rolls, the speeds of which will increase or decrease together. Small individual speed adjustments can be made, however, by adjusting the field rheostats 69 on the auxiliary motors. The armatures of the other auxiliary motors would be connected in parallel on the leads 87, connected to the D. C. power conductors 80.

Figure 3:
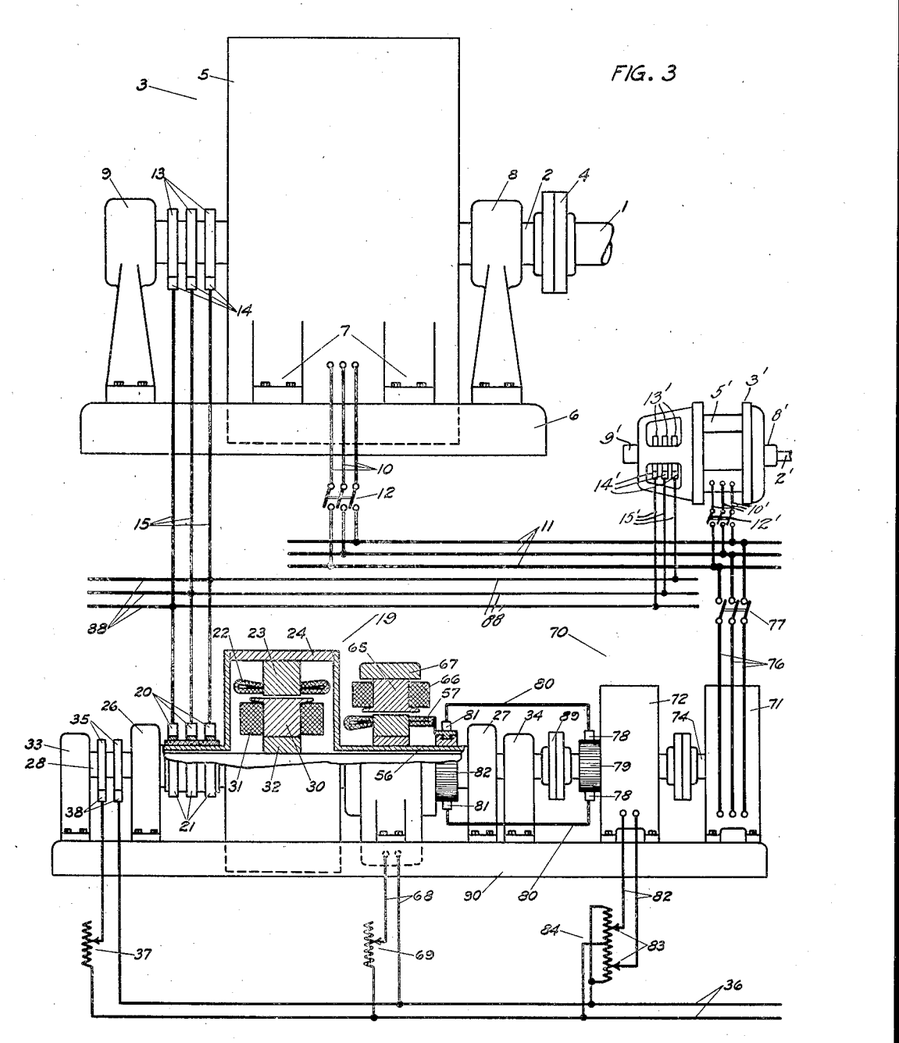
Fig. 3 is another form in which the synchronous machine is connected to the motor generator set.

Fig. 3 shows an arrangement in which the synchronous motor instead of being connected to the shaft of the induction motor, as in Figs. 1 and 2, is connected to the shaft of the regulating motor generator set. In this case mechanical energy developed in the synchronous motor is converted into electrical energy in the A. C. machine 71 of the motor generator set 70 and returned to the A. C. supply mains 11. In this case the synchronous machine 19 is shown of the more conventional type similar to Fig. 1 with the field poles carried on the rotor shaft, while the armature windings are carried in the rotatable frame 24.

This form of the invention, while it has the disadvantage of requiring slip rings on both the induction and synchronous motors, has the advantage of requiring less space at the drive shaft. The synchronous motor and regulating equipment may be placed at any convenient location.

It is also possible with this form to control more than one induction motor from one synchronous motor. A second induction motor 3' is shown controlled in unison with the other motor 3. Similar parts are given similar reference numbers, primed. The second motor 3' is also a wound rotor induction motor having a primary winding connected by leads 10' to the bus 11 through a switch 12'. The secondary or rotor winding is brought out to collector rings 13' and connected in parallel with the secondary leads 15 of the other motor 3 by means of brushes 14', leads 15', and conductors 88.

Other induction motors can be connected in parallel in a similar manner by connecting their primary windings to the bus 11 and their secondary windings to the secondary bus 88.

All of the induction motors thus connected operate at speeds exactly proportional to their synchronous speeds, or if all have the same number of poles, they run in synchronism.

In Fig. 3 the synchronous motor shaft 28 is direct connected to the shaft 74 of the motor generator set 70 by means of a coupling 89. The armature of the D. C. auxiliary machine is connected in series with that of the generator 72 as before. All the mechanically connected machines are mounted on a common base 90.

The operation of the arrangement shown in Fig. 3, is similar to that of Fig. 2 except that one of the rotatable members of the synchronous motor always runs at substantially the synchronous speed of the constant speed machine 71. With the other member of the synchronous motor at rest the frequency in its armature is proportional to the ratio of the number of poles in the synchronous motor 19 to the number of poles in the A. C. machine 71 of the motor generator set. This frequency is increased or decreased by rotating the latter member of the synchronous motor as before.

This increase or decrease in frequency in the secondary of the induction motor results in a respective decrease or increase in its shaft speed.

Fig. 4 shows a modification of the preferred form Fig. 2. The overall length is much shorter due to the elimination of several pedestal bearings and a coupling. The rotors of the synchronous and induction motors are shown keyed to the same shaft, while the rotating field member of the synchronous motor is carried directly on the same shaft on preferably ball or roller bearings 91, 92. Both machines 3, 19 are supported on the two pedestal bearings 8, 9 which are fastened to the base 6.

The D. C. machine 58 is a comparatively high speed machine in this case, and is mechanically connected to the frame of the synchronous motor 55 by a multiple belt drive 41 which is driven by a sheave 39 on the armature shaft 93. The D. C. auxiliary machine 58 is controlled from the motor generator set 70 in the manner described in connection with Fig. 2.

The layout shown in Fig. 4 offers the advantages of requiring less room, more unified and simple construction, and permits the use of a higher speed and therefore smaller D. C. motor. This arrangement is, however, limited by the horsepower that can be transmitted through the belt drive and by the size of machines that can be conveniently supported between the two pedestal bearings.

A method of connecting the starting rheostat in series with the circuit including the induction motor secondary 46 and the synchronous motor armature 22 is shown in Fig. 4. The neutral leads 51A of the armature winding 22 of the synchronous motor are brought out through the hollow shaft 2 to the collector rings 13A. The current in the series winding therefore flows through the rings 13A and brushes 14A to the adjustable rheostat 16 which is brought to the short circuited position after the motors are brought up to speed. This rheostat is desirable when it is necessary to start the motors under load. In Fig. 5, I have shown the application of the principles of the present invention to a frequency converter for interconnecting two alternating current systems, where it is necessary to provide a certain amount of relative frequency adjustment between the two systems. This example is used here to illustrate the second principle of my invention, namely, to generate power at adjustable frequency from mechanical energy at constant speed.

Referring to Fig. 5, bus bars 94 of a system of one frequency are connected to bus bars 95 of a system of different frequency by means of a frequency converter set 96. The frequency converter set 96 is composed of a main synchronous machine 97, a wound rotor induction machine 98 concatenated with a synchronous machine 99, of which the rotor 100 and frame 101 are both mounted on bearings for independent rotation. An auxiliary D. C. machine 102 is coupled to the frame 101 of the synchronous machine. The auxiliary D. C. machine 102 is controlled by a direct current generator 103. Excitation for the fields is supplied from an exciter 104. The main synchronous machine 97, the induction machine 98, the rotor 100 of the synchronous machine 99, the D. C. generator 103, and the exciter 104 are shown all coupled together and mounted on a common base 105. This is but one of several possible arrangements of machines. For instance, the D. C. generator and exciter could be driven by a separate motor. Likewise, the synchronous motor 99, instead of being coupled to the induction motor 98, could be placed separately along with the motor generator set, as shown in Fig. 3.

The armature winding of the main synchronous machine 97 is connected to the bus bars 94 of one system through leads 106 and a circuit breaker 107. The field winding, brought out to collector rings 108 is energized from exciter bus 109 through field switch 110, rheostat 111 for adjusting the power factor, leads 112, and brushes 113.

The shaft 114 of the synchronous machine is coupled to the shaft 116 of the induction machine 98 by a coupling 115.

The primary winding 117 of the induction machine 98 is connected by leads 118 through circuit breaker 119 to the bus bars 95 of the second system.

Preferably the induction machine 98 is connected to the system of higher frequency, as the ratio of the number of poles on the induction machine 98 to the number of poles on the concatenated synchronous machine 99 is greater; consequently, the synchronous machine 99 is smaller than if the induction machine were connected to the system of lower frequency.

The secondary winding 120 of the induction machine is connected in series with the synchronous motor armature winding 122, which in this case is located on the rotor 100. The leads 121 from the induction motor secondary winding are connected to the leads 123 from the synchronous motor armature at the shaft coupling 124, which I shall later describe in connection with Fig. 6, or other means may be provided for separating the machines electrically when they are separated mechanically at the coupling 124.

The synchronous machine 99 consists of a rotor 100 on which is mounted the armature windings 122, and a field 125 carried on the frame 101. The rotor is supported on two pedestal bearings 126, 127 and the field yoke or frame is supported on two other pedestal bearings 128, 129. The field coils are excited from the exciter bus 109 through a switch 130, an adjustable rheostat 131, and field leads 132 to brushes 133 which cooperate with the field collector rings 134.

The armature 135 of the D. C. auxiliary machine 102 is mounted on an extension 136 of the synchronous motor frame 101. It is connected electrically in series with the armature 137 of the D. C. generator 103 through leads 88. The field 138 of the D. C. motor is excited from the exciter bus 109 through a switch 139 and an adjustable rheostat 140.

The shaft 142 of the D. C. generator 103 is coupled to the shaft 141 of the synchronous motor 99 by means of a coupling 143. The field is excited from the exciter bus 109 through a switch 144 and a potentiometer type rheostat 145 by which the voltage of the generator 103 can be adjusted over its entire range from maximum positive to maximum negative polarity. Excitation is furnished by an exciter 104 which is shown mounted on the generator frame. Its armature 146 is mounted on an extension of the generator shaft 142 and is connected to the exciter bus 109 through leads 147. The exciter voltage is controllable by means of a rheostat 148 in the circuit of its shunt field. The exciter can be furnished with a compound winding to provide better voltage regulation.

The operation of the frequency converter is as follows:

The main synchronous machine 97 runs at a speed determined by the frequency of the voltage on the bus 94; consequently, all the machines on the main shaft operate at this speed. The sum of the number of poles on the induction machine 98 plus the number of poles on the synchronous machine 99 is that number of poles which will give a generated frequency at the terminals 118 equal to the nominal frequency of the bus voltage with the frame 101 of the synchronous machine at rest and the shaft running at the speed of the synchronous motor. For example, assuming a nominal frequency of 25 cycles on the synchronous motor bus 94 and 60 cycles on the induction machine bus 95, there would be ten poles on the synchronous machine and a sum of 24 poles on the induction machine 98 and the synchronous machine 99, while the speed of the shaft would be 300 R. P. M. The 24 poles could then be divided between the induction and synchronous machines in the ratio of 22 and 2, 20 and 4, 18 and 6, etc., depending on the range desired. A ratio of 22 and 2 poles provides for a frequency range from approximately 55 to 65 cycles on the 60 cycle end with 25 cycles on the 25 cycle end, or from 23 to 27 cycles approximately on the 25 cycle end with 60 cycles on the 60 cycle end. The range of frequency ratio fixes the ratio of capacities of induction machine to the concatenated synchronous machine of 22 to 2. In order to obtain a variation of plus or minus 5 cycles the frame of the synchronous motor must be rotated plus or minus 300 R. P. M. The capacity of the D. C. machine is the same in this case as that of the synchronous machine or $\frac{1}{12}$ of that of the total.

The operation of the frequency converter can best be described by an example:

Assuming the two frequencies to be 25 and 60 cycles, respectively, if the frame 101 of the synchronous machine 99 be held stationary, the concatenated couple will be turned at synchronous speed and the amount of power interchanged between the systems will depend on the relative phase relations of the terminal voltages of the two machines. Power may be forced from the 60 cycle system to the 25 cycle system by adjusting the potentiometer rheostat 145, so as to cause the auxiliary D. C. motor 102 to tend to increase the speed of the induction motor 98 by exerting a torque in the same direction of rotation as that of the main shaft. This tendency to higher speed causes the main synchronous machine to force power into the system bus 94. Likewise, moving the rheostat 145 in the opposite direction causes a tendency for the induction motor to slow down which results in the main synchronous machine 97 changing from a generator to a motor, and the flow of power reverses.

If the frequency of one of the systems should start to increase it would immediately cause a flow of power into the other system, which would necessitate a readjustment of power flow as described above. This adjustment could be made automatic by means of suitable current or power flow relays operating on a small pilot motor for adjusting the potentiometer rheostat.

It is to be understood that the frequency converter is but one embodiment of the principle of my invention for generating electric power at adjustable frequency from mechanical energy at constant speed. For example, the buses 95 connected to the induction machine may be connected to a group of motors, the speed of which would be controlled by adjusting the impressed frequency. Likewise, instead of a synchronous motor 97, any prime mover might be used to drive the shaft at substantially constant speed.

Figure 6:
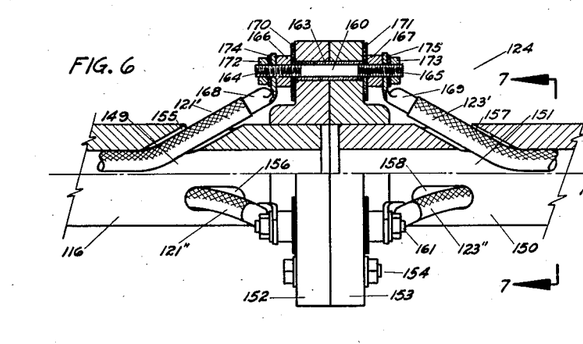
Fig. 6 is a cross section of a shaft coupling showing a method for connecting the leads between the synchronous and induction motors to facilitate the disassembly of the machines.
Figure 7:
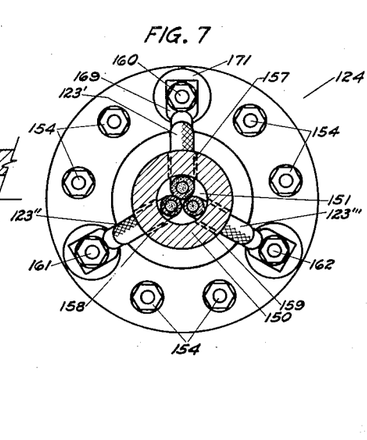
Fig. 7 is an end view of the shaft coupling shown in Fig. 6.

Figs. 6 and 7 show a method of connecting the leads from the induction motor secondary winding to those of the synchronous motor armature winding. Although in Figs. 1 to 4, these leads have been indicated as running through the center of the coupling, this would in some cases make it difficult to remove one of the machines for maintenance or repair. It would therefore be desirable in most cases to bring the leads out at each side of the coupling and make the connection either through the flanges of the coupling, as shown in Figs. 6 and 7, or entirely outside the coupling.

Fig. 6 shows a side elevation of the coupling 124 between the two concatenated machines, the upper half being shown in cross section. Fig. 7 shows an end view of the coupling. The induction motor shaft 116 has a hollow portion 149 through which are brought the secondary leads 121 of the induction machine 98. Likewise, the shaft 150 of the synchronous machine 99 has a hollow portion 151 through which are brought the armature leads 123. The two shafts are lined up end to end, and one half 152 of the coupling 124 being keyed to the induction motor shaft 116, while the other half 153 of the coupling 124 is keyed to the synchronous motor shaft 150. The two halves of the coupling are bolted together by bolts 154.

Openings 155, 156 are provided in the induction motor shaft to bring out the leads 121 of the induction motor, one lead 121' being brought out through one opening 155, the second lead 121'' being brought out through another opening 156, and the third lead is brought out through a third opening (not shown). These openings are preferably spaced equally around the shaft, but it is also possible to bring all leads out through a single opening.

Likewise, the three leads, 123', 123'', and 123''' from the synchronous motor are brought out of the shaft 150 through three openings 157, 158, 159, respectively.

Connections between the three pairs of leads are made by means of studs 160, 161, 162 which are inserted in three holes in the coupling flanges. For example, one stud 160 is inserted in a hole in the coupling, being insulated from the coupling by a tube-shaped insulating piece 163. The stud 160 is threaded on both ends 164, 165 and metallic spacing pieces 166, 167 are screwed down on each end to hold the stud in position and to provide contact surfaces for the lugs 168, 169 which are soldered on the ends of the leads 121', 123', respectively. Insulating washers 170, 171 insulate the spacing pieces from the coupling flanges. The lugs are held in place by nuts 172, 173 which are screwed on each end of the stud, with washers 174, 175 between the nuts and the lugs.

Likewise, the second pair of leads 121'', 123'' are connected together by means of a lug 161 and the third pair of leads are similarly connected by a lug 162. The method of connection of the other two pairs of leads is similar to that described for the first pair. It would then be desirable to tape all live connections.

It is to be understood that this is but one embodiment of the principle of bringing out the leads at the coupling. For example, they could simply be brought together outside the coupling flange, and the two lugs bolted together and the leads suitably tied down.

I do not intend to be limited to the details shown and described, except as they are recited as essential in the appended claims. For instance, the machine with the rotatable frame could be an induction motor instead of a synchronous motor, although the torque and power factor of such a combination would be poor.

I claim:

1. A system of adjustable speed control comprising an induction machine, electric power supply connected thereto, a synchronous machine, an electric circuit interconnecting said machines, and double range regulating means for controlling the frequency of the energy in said circuit, said regulating means, including an auxiliary machine and control therefor, whereby changes in the speed of at least one of the first two mentioned machines can be effected over a continuous range, substantially independent of load, by adjusting the speed of said auxiliary machine over its normal range twice in relatively opposite directions of rotation.

2. In combination, a synchronous motor concatenated with an induction motor and double range regulating means for producing magneto inductive effects in the interconnecting electric circuit, said regulating means including an auxiliary machine and control therefor, whereby corresponding changes in speed are effected over a continuous range substantially independent of load by adjusting the speed of said auxiliary machine over its normal range twice in relatively opposite directions of rotation.

3. A system of adjustable speed control consisting of a main alternating current motor, a second alternating current motor, an interconnecting circuit comprising one winding of each motor and conductors connecting said windings in series, and regulating means, said means including an auxiliary machine and control therefor, for controlling the speed of said main motor over a continuous range independent of load by adjusting the speed of said auxiliary machine over its normal range twice in relatively opposite directions of rotation, thereby regulating the frequency of the alternating current energy in said interconnecting circuit, the increment of frequency corresponding to an increment of speed being generated in the windings of one of said motors.

4. A combination of two A. C. motors, the first motor having one stationary member and one rotatable member, the second motor having two rotatable members, said motors being connected in concatenation, and means for generating energy of adjustable frequency in the windings of one of the motors whereby the speed is controlled over a continuous range by regulating means having two relatively opposite regulating ranges.

5. In combination, two alternating current motors in concatenation, said motors having a common driving shaft, one of the motors having a frame and a rotor, both frame and rotor being mounted on bearings, and double range control means for controlling the rotation of said frame for regulating the speed of the shaft over a continuous speed range.

6. In a system of speed control, the combination of a wound rotor induction motor, the speed of which is controlled by control of the frequency of the energy of the secondary circuit, control means for controlling said frequency consisting of a synchronous machine having an armature winding adapted for connecting in series with the secondary winding of the induction motor, both rotor and frame members of said synchronous machine being mounted on bearings, a constant speed type machine coupled to one of said members and connected to a source of electrical energy, and means for controlling the rotation of the other of said members to regulate the frequency in said armature winding.

7. In a system of the class described, an induction motor and a synchronous motor in concatenation, said synchronous motor comprising a rotor member and a frame member, each member mounted on bearings for independent rotation, an auxiliary direct current machine mechanically connected to the rotatable frame of said synchronous motor, a motor generator set comprising a direct current generator connected electrically in series with said auxiliary machine driven by a constant speed alternating current motor and means for controlling the field of said direct current generator over a continuous range from maximum intensity in one polarity, through zero, to maximum intensity in the opposite polarity.

8. A system of adjustable speed control consisting of a first load shaft, a second load shaft, a main motor coupled to said first load shaft, said motor having a winding designed for alternating current, a synchronous motor comprising an armature member and a field member, both of said members being mounted on bearings, said armature member being connected electrically to the winding of said main motor, one member of said synchronous motor being coupled to said second load shaft, and double range regulating means for controlling the rotation of the other member of the synchronous motor from standstill in either direction for controlling the frequency of the electrical energy in said main motor winding and thereby controlling the speed of said first load shaft.

9. A system of adjustable speed control consisting of a load shaft, a wound rotor induction motor coupled to said load shaft, a source of electrical energy, a primary winding on said induction motor adapted for connection to said source of energy, a synchronous motor comprising an armature member and a field member, both of said members being mounted on bearings, said armature member having a winding connected electrically in series with the rotor winding of said induction motor, a third alternating current machine connected to the source of electrical energy and coupled to one member of said synchronous motor, and means for controlling the rotation of the other member of the synchronous motor.

10. In a system of the class described, a load shaft, an induction motor and a synchronous motor in concatenation coupled to said load shaft, said synchronous motor comprising a rotor member and a frame member, each member mounted on bearings for independent rotation, and an auxiliary machine mechanically connected with one member of said synchronous motor for controlling its rotation, a second auxiliary machine for controlling and supplying power to first said auxiliary machine, said second auxiliary machine being coupled to said load shaft.

11. A system of adjustable frequency control comprising a driving means of substantially constant speed, a wound rotor induction machine, a synchronous machine having an armature winding connected in series with the secondary winding of said induction machine, both rotor and frame of said synchronous motor being mounted on bearings, said rotor being coupled to said driving means, and means for controlling the rotation of said frame through a continuous range from maximum positive speed, through zero, to maximum negative speed, independent of load to regulate the frequency in said armature winding and, hence, the frequency of the energy generated by said induction machine.

12. An adjustable ratio frequency converter consisting of a main alternating current machine connected to a circuit of one frequency, a main wound rotor induction machine connected to a circuit of a second frequency, a synchronous machine concatenated with said main induction machine, said synchronous machine having a rotor member and a frame member, both members mounted on bearings, an auxiliary D. C. machine coupled to said frame member for controlling its rotation and, hence, the relative frequency of the two said circuits, a direct current generator connected in series with said direct current machine and means for controlling the field of intensity of said direct current generator over a continuous range from maximum intensity in one polarity, through zero, to maximum intensity in the opposite polarity independent of load.

13. In a system of the class described, a concatenated pair of machines consisting of a wound rotor induction machine having a hollow shaft, a synchronous machine having a hollow shaft coupled to said first hollow shaft by means of a shaft coupling, the rotor member of said synchronous machine mounted on said second hollow shaft, said rotor member carrying the armature windings, the frame member of said synchronous machine carrying the field windings, said armature windings having terminal leads, said leads being laid in said hollow shaft and brought out through openings in said hollow shaft just behind said shaft coupling, said induction motor rotor windings also having terminal leads, said leads being laid in said induction motor hollow shaft and brought out through openings in said shaft just behind said coupling, and means for connecting said synchronous motor armature leads to said induction motor secondary leads outside of said hollow shaft.

14. In combination, a pair of machines having each a rotor member bearing a winding, a hollow shaft for each rotor member, a coupling for said hollow shafts, conductors from each winding extending through the corresponding hollow shaft and means carried in unison with said coupled shafts for coupling said conductors at said shaft coupling.

15. A system of adjustable speed control comprising a drive shaft, an induction motor connected to said shaft, and having a secondary winding, a synchronous motor having a rotatable frame and provided with an alternating current winding in series with said secondary winding, means for rotating the frame of said synchronous motor and means comprising an adjustable rheostat connected in series with said alternating current winding and said secondary winding for starting said drive shaft against a heavy torque.

16. A system of adjustable speed control comprising an induction motor having a secondary winding, a synchronous motor having a rotatable frame and provided with an alternating current winding in series with said secondary winding, means comprising a reversing switch for reversing one of said windings with respect to the other, and means for rotating the frame of said synchronous motor over a continuous range of from maximum speed in one direction, through zero, to maximum speed in the opposite direction, independent of load.

17. A system of speed control comprising a main alternating current machine having a winding, the speed of said machine being controlled by control of the frequency of the energy in said winding, a synchronous machine having an armature winding adapted for connecting in series with said main motor winding, both rotor and frame members of said synchronous machine being mounted on bearings, and means for independently setting the speeds of each of said members to determine the frequency in said armature winding.

18. A system of speed control comprising a main alternating current machine having a winding, the speed of said machine being controlled by control of the frequency of the energy in said winding, a synchronous machine having an armature winding adapted for connecting in series with said main motor winding, both rotor and frame members of said synchronous machine being mounted on bearings, means for operating one of said members at substantially constant speed, and means for controlling the speed of the other member to regulate the frequency in said armature winding.

19. A system of speed control comprising a main alternating current machine having a winding, the speed of said machine being controlled by control of the frequency of the energy in said winding, a synchronous machine having an armature winding adapted for connecting in series with said main motor winding, both rotor and frame members of said synchronous machine being mounted on bearings, means for operating one of said members at substantially constant speed, and means for controlling the speed of the other member from standstill over a range in either direction of rotation to control the frequency in said armature winding.

20. A system of adjustable frequency control comprising an alternating current machine having a frame member and a rotor member each mounted on bearings, means for rotating one of said members at substantially constant speed, and means for regulating the speed of the other member over a continuous range of from maximum speed in one direction, through zero, to maximum speed in the opposite direction, independent of load.

21. A system of adjustable frequency control comprising an alternating current machine having a frame member and a rotor member, both members being mounted on bearings, a constant speed alternating current motor coupled to one of said members and means for regulating the speed of the other member, said means comprising an adjustable speed direct current machine coupled to the other of said members, a direct current machine operated at constant speed and connected electrically in series with said adjustable speed machine, and means for controlling the field intensity of said last named machine over a continuous range from maximum intensity in one polarity, through zero, to maximum intensity in the opposite polarity.

22. In a system of the class described, a main shaft, a wound rotor induction motor connected to said shaft, a synchronous machine having both its frame member and rotor member mounted on bearings, one of said members being connected to said main shaft, the other member being controlled at adjustable speeds by a direct current machine, said direct current machine being controlled by another direct current machine coupled to said main shaft.

23. In combination, a load shaft, an induction motor and a synchronous motor in concatenation coupled to said shaft, and means for controlling the frequency of the energy in the interconnecting circuit, said means including an auxiliary machine connected to said load shaft.

24. In combination with an induction motor having a primary winding and a secondary winding, a source of alternating current energy connected to said primary winding, a synchronous machine having a winding, an electric circuit interconnecting said synchronous machine winding and said secondary winding, and regulating means, including an auxiliary machine and control therefor, for controlling the frequency of the energy in said circuit and hence the speed of said induction motor over a continuous range, substantially independent of load, said range extending entirely on one side of the synchronous speed of said induction motor, said auxiliary machine traversing its speed range twice in relatively opposite directions of rotation to effect the control of said induction motor over its continuous speed range.

25. A system of adjustable speed control consisting of a main alternating current motor, a second alternating current motor, an interconnecting circuit comprising one winding of each motor and conductors connecting said windings in series, means for controlling the speed of said main motor over one continuous range extending entirely below the synchronous speed of said main motor and over a second continuous range extending entirely above said synchronous speed, said means comprising regulating means for controlling the frequency of the alternating current energy in said interconnecting circuit, said regulating means operable over two relatively opposite regulating ranges within each of said speed ranges.

26. In combination with an induction motor having a primary winding and a secondary winding, a source of alternating current energy connected to said primary winding, a synchronous machine having a winding connected in series with said secondary winding, and regulating means for controlling the frequency of the energy flowing between said series connected windings and hence controlling the speed of said induction motor, substantially independent of load, over one continuous range extending entirely below the synchronous speed of the induction motor and over a second continuous range extending entirely above said synchronous speed, said regulating means operating over two relatively opposite regulating ranges within each of said speed ranges.

27. In combination, a plurality of alternating current motors, each motor having at least one winding, said windings of said motors being connected in multiple, a synchronous machine having a rotor member and a frame member, both of said members being rotatably mounted on bearings, one of said members having a winding connected in series with said multiple connected motor windings, means for operating one of said rotatable members at substantially constant speed, and means for controlling the speed and direction of rotation of the other of said members to control the frequency of the alternating current energy flowing between said synchronous machine winding and said multiple connected motor windings.

28. In combination, a source of alternating current energy, a plurality of induction motors, each motor having a primary winding and a secondary winding, said primary windings being connected to said source of energy and said secondary windings being connected together in multiple, a regulating machine comprising a rotor member and a frame member, both of said members being mounted on bearings for independent rotation, an alternating current winding on one of said members, said winding being connected in series with said multiple connected secondary windings, means for operating one member of said regulating machine at substantially constant speed, and means for controlling the speed and direction of rotation of the other of said members to regulate the frequency of the alternating current energy flowing between said regulating machine and said induction motors.

29. A system of speed control comprising in combination, a main wound rotor induction motor, the speed of which is controlled by control of the frequency of the energy in the rotor or secondary circuit thereof, and a frequency control motor-generator set adapted for location apart from said main motor, said motor-generator set including a synchronous machine having an armature winding connected in series with the rotor winding of said main motor, said synchronous machine having a frame member and a rotor member, both of said members being rotatably mounted on bearings, a second induction machine mechanically connected to one of said members for determining the speed thereof, and another machine mechanically connected to the other of said members for adjusting the speed and direction of rotation of the last said member to regulate the frequency of the energy in said secondary circuit.

30. A system of adjustable speed control comprising in combination a main wound rotor induction machine having a primary winding and a secondary winding, the speed of said machine being controlled by control of the frequency of the energy in the secondary winding, an adjustable frequency machine of the synchronous type, having an armature winding connected in series with said secondary winding, said synchronous machine comprising a rotor member and a frame member, each of said members being rotatably mounted on bearings, means for coupling one of said members to said induction machine, and means comprising a multi-speed, pole changing type induction machine mechanically connected to the other of said members for determining the speed of said member at any one of a plurality of speeds in either direction of rotation.

31. In combination, a shaft, a main electrical machine connected thereto, said machine having a winding, the speed of the machine being controlled by control of the frequency of the current in said winding, an adjustable frequency machine having a winding connected in series with said winding of the main machine, said adjustable frequency machine comprising a rotor member and a frame member, each of said members being rotatably mounted, one of said members being connected to said shaft, and means comprising a multi-speed, pole changing type induction machine mechanically connected to the other of said members for holding the speed of said member at any one of a plurality of speeds.

32. In combination, a main electrical machine having a winding, the speed of said machine being controlled by control of the frequency of the current in said winding, an adjustable frequency machine having a winding connected in series with said winding of the main machine, said adjustable frequency machine comprising a rotor member and a frame member, each of said members being rotatably mounted, means comprising a multi-speed, pole changing type induction motor mechanically connected to one of said members, for holding said member at any one of a plurality of selectable speeds, and means for resisting the torque of the other of said members.

33. In combination, an adjustable frequency machine having a rotor member and a frame member, each of said members being rotatably mounted, means comprising a multi-speed, pole changing type machine mechanically connected to one of said members for rotating the member at any one of a plurality of selectable speeds in either direction of rotation, and means for determining the speed of rotation of the last said member.

34. In combination, an adjustable frequency machine having a rotor member and a frame member, each of said members being rotatably mounted, means comprising a multi-speed, pole changing type machine mechanically connected to one of said members for rotating the member at any one of a plurality of selectable speeds in either direction of rotation, and means comprising a wound rotor type induction machine connected to the other of said members, for determining the speed of rotation of the last said member.

ALLEN M. ROSSMAN.